(12) United States Patent
Jaradi et al.

(10) Patent No.: US 12,017,715 B2
(45) Date of Patent: Jun. 25, 2024

(54) THREE-WHEELED VEHICLE AIRBAG

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 17/551,280

(22) Filed: Dec. 15, 2021

(65) Prior Publication Data
US 2023/0182834 A1 Jun. 15, 2023

(51) Int. Cl.
*B62D 61/08* (2006.01)
*B60J 1/02* (2006.01)
(Continued)

(52) U.S. Cl.
CPC ............... *B62D 61/08* (2013.01); *B60J 1/02* (2013.01); *B60R 21/0134* (2013.01);
(Continued)

(58) Field of Classification Search
CPC ... B62D 61/08; B60R 21/0134; B60R 19/205; B60R 21/34; B60R 2021/346;
(Continued)

(56) References Cited

U.S. PATENT DOCUMENTS 4,227,717 A * 10/1980 Bouvier ................... B62J 27/20
280/730.2
5,927,424 A * 7/1999 Van Den Brink ..... B62K 5/027
280/124.103
(Continued)

FOREIGN PATENT DOCUMENTS

CN 109153420 A * 1/2019 ......... B60R 21/0132
DE 102016108797 A1 * 5/2017
(Continued)

OTHER PUBLICATIONS

Computer generated English translation of CN 109153420 (Year: 2024).*

(Continued)

*Primary Examiner* — Amy R Weisberg
*Assistant Examiner* — Tiffany L Webb
(74) *Attorney, Agent, or Firm* — Frank A. MacKenzie; Bejin Bieneman PLC

(57) ABSTRACT

A three-wheeled vehicle includes a vehicle frame defining an occupant compartment. The vehicle frame has a front. The vehicle frame includes a first side extending vehicle-rearward from the front. The vehicle frame includes a second side extending vehicle-rearward from the front. The vehicle frame includes a bottom segment and a top segment. The top segment and the bottom segment extend along the front and the first side and the second side of the vehicle frame. The bottom segment and the top segment are tubular. The three-wheeled vehicle includes a first wheel at a midline of the front of the vehicle frame, a second wheel on the first (Continued)

side of the vehicle frame, and a third wheel on the second side of the vehicle frame. The three-wheeled vehicle includes an airbag supported by the bottom segment. The airbag is inflatable exterior to the vehicle frame upwardly toward the top segment from an uninflated position to an inflated position. The airbag in the uninflated position is elongated along the front and the first side and the second side of the vehicle frame.

18 Claims, 8 Drawing Sheets

(51) Int. Cl.
*B60R 21/0134* (2006.01)
*B60R 21/233* (2006.01)
*B60R 21/2338* (2011.01)
*B62D 31/00* (2006.01)

(52) U.S. Cl.
CPC ........ *B60R 21/233* (2013.01); *B60R 21/2338* (2013.01); *B62D 31/003* (2013.01)

(58) Field of Classification Search
CPC ............ B60R 2021/36; B60R 2021/138; B62J 27/20; B62K 5/06
See application file for complete search history.

(56) References Cited

U.S. PATENT DOCUMENTS

| | | | |
|---|---|---|---|
| 6,773,028 B2* | 8/2004 | Itabashi | B60R 21/23138 |
| | | | 280/734 |
| 7,073,619 B2* | 7/2006 | Alexander | B60R 21/36 |
| | | | 180/274 |
| 8,662,228 B2 | 3/2014 | Hill et al. | |
| 8,955,632 B2 | 2/2015 | Schurna et al. | |
| 10,046,726 B2* | 8/2018 | Richard | B60R 21/0132 |
| 11,198,482 B2* | 12/2021 | Sugioka | B62J 45/40 |
| 11,608,025 B2* | 3/2023 | Cord | B60R 21/207 |
| 2015/0367894 A1* | 12/2015 | Ogbonna | B60N 2/01 |
| | | | 180/215 |
| 2021/0171148 A1* | 6/2021 | Acevedo Orduña | B62J 27/30 |
| 2021/0229619 A1 | 7/2021 | Faruque et al. | |
| 2022/0177035 A1* | 6/2022 | Stronach | B62D 65/024 |

FOREIGN PATENT DOCUMENTS

| | | | | |
|---|---|---|---|---|
| FR | 2770820 A1 * | 5/1999 | | B60G 9/02 |
| GB | 2508709 A | 6/2014 | | |

OTHER PUBLICATIONS

Computer generated English translation of DE 10 2016 108797 (Year: 2024).*
Computer generated English translation of FR 2770820 (Year: 2024).*

* cited by examiner

THREE-WHEELED VEHICLE AIRBAG

BACKGROUND

Three-wheeled vehicles are lightweight, affordable vehicles used in urban transportation. Three-wheeled vehicles can be designed to accommodate a single-occupant only or multiple occupants. Three-wheeled vehicles have a different center of gravity and crash dynamics than a two-wheeled vehicle or a four-wheeled vehicle.

DETAILED DESCRIPTION

Figure 1:
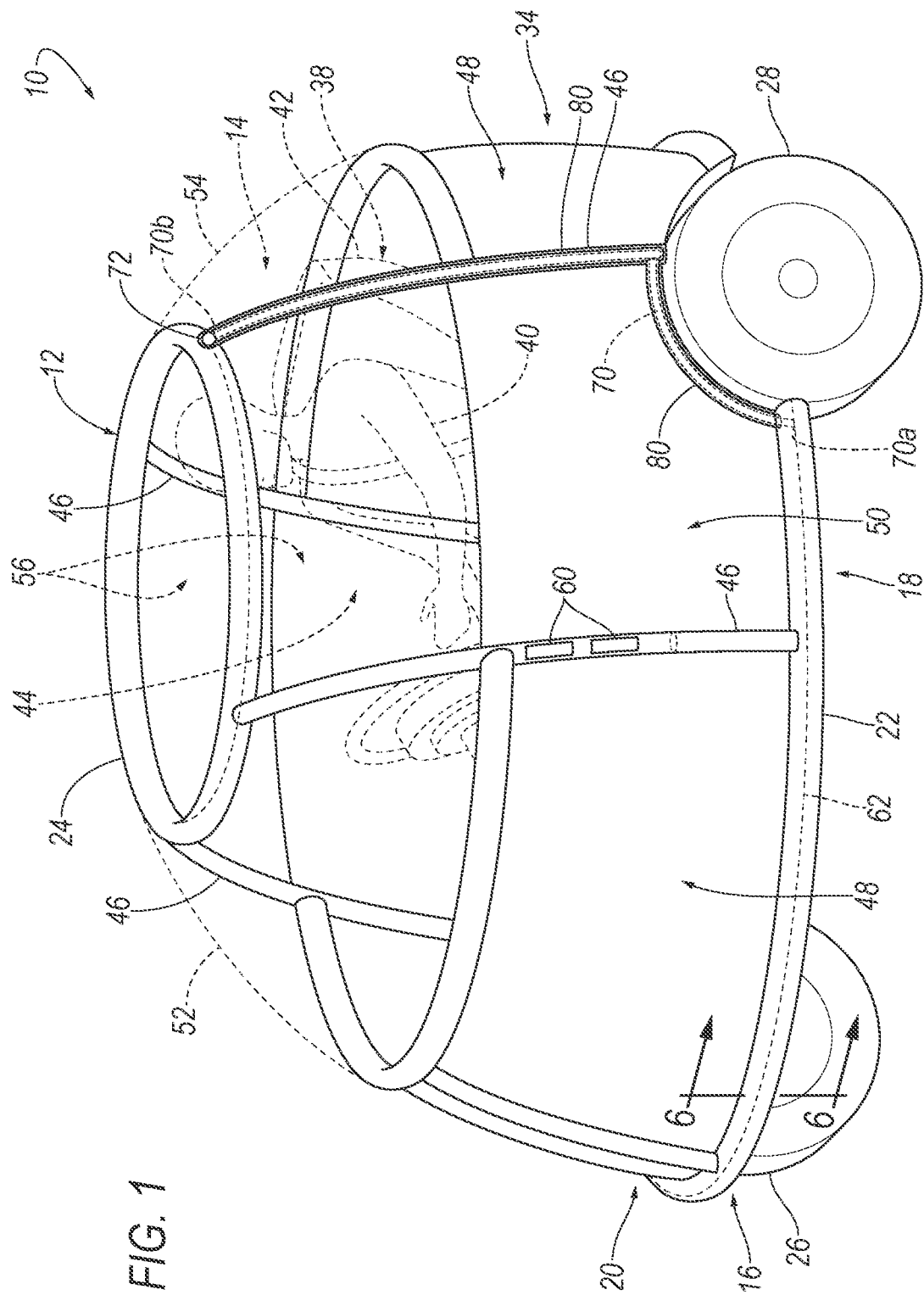
FIG. 1 is a perspective view of a three-wheeled vehicle having an airbag and a second airbag in the uninflated position.

The three-wheeled vehicle includes a vehicle frame defining an occupant compartment. The vehicle frame has a front. The vehicle frame includes a first side extending vehicle-rearward from the front. The vehicle frame includes a second side extending vehicle-rearward from the front. The vehicle frame includes a bottom segment and a top segment. The top segment and the bottom segment extend along the front and the first side and the second side of the vehicle frame. The bottom segment and the top segment are tubular. The three-wheeled vehicle includes a first wheel at a midline of the front of the vehicle frame, a second wheel on the first side of the vehicle frame, and a third wheel on the second side of the vehicle frame. The three-wheeled vehicle includes an airbag supported by the bottom segment. The airbag is inflatable exterior to the vehicle frame upwardly toward the top segment from an uninflated position to an inflated position. The airbag in the uninflated position is elongated along the front and the first side and the second side of the vehicle frame.

The bottom segment may be elongated from the front of the vehicle frame to the second wheel and the third wheel.

The three-wheeled vehicle may include a vehicle powertrain that drives the first wheel, second wheel, and/or third wheel.

The airbag in the inflated position may extend to the second wheel and to the third wheel.

The airbag in the inflated position may extend from the bottom segment to the top segment.

The three-wheeled vehicle may include a tether connected to the airbag and a retractor connected to vehicle frame above the bottom segment, the retractor operatively connected to the tether to pull the tether upwardly.

The retractor may be connected to the top segment.

The top segment of the vehicle frame may be ring-shaped.

The vehicle frame may include upright segments extending from the bottom segment to the top segment, the upright segments being tubular.

The three-wheeled vehicle may include a second airbag supported by the top segment, the second airbag being ring-shaped along the top segment and being inflatable downwardly into the occupant compartment.

The occupant compartment may be a single-occupant compartment designed to house no more than one occupant.

The three-wheeled vehicle may include a vehicle door hingedly connected to the vehicle frame on one of the sides of the frame and between the bottom segment and the top segment.

The airbag may extend across the door in the inflated position.

The airbag may extend from the bottom segment to the top segment in the inflated position.

The three-wheeled vehicle may include a windshield at the front of the vehicle frame.

The airbag may extend from the bottom segment to the top segment in the inflated position.

The three-wheeled vehicle may include a controller and a pre-impact sensor, the controller being programmed to inflate the airbag in response to a detected pre-impact event by the pre-impact sensor.

With reference to the Figures, wherein like numerals indicate like parts throughout the several views, a three-wheeled vehicle 10 is shown. The three-wheeled vehicle 10 includes a vehicle frame 12 defining an occupant compartment 14. The vehicle frame 12 has a front 16. The vehicle frame 12 includes a first side 18 extending vehicle-rearward from the front 16. The vehicle frame 12 includes a second side 20 extending vehicle-rearward from the front 16. The vehicle frame 12 includes a bottom segment 22 and a top segment 24. The top segment 24 and the bottom segment 22 extend along the front 16 and the first side 18 and the second side 20 of the vehicle frame 12. The bottom segment 22 and the top segment 24 are tubular. The three-wheeled vehicle 10 includes a first wheel 26 at a midline of the front 16 of the vehicle frame 12, a second wheel 28 on the first side 18 of the vehicle frame 12, and a third wheel 30 on the second side 20 of the vehicle frame 12. The three-wheeled vehicle 10 includes an airbag 32 supported by the bottom segment 22. The airbag 32 is inflatable exterior to the vehicle frame 12 upwardly toward the top segment 24 from an uninflated position to an inflated position. The airbag 32 in the uninflated position is elongated along the front 16 and the first side 18 and the second side 20 of the vehicle frame 12.

The vehicle frame 12 allows the airbag 32 to be supported on the bottom segment 22. Since the bottom segment 22 and the top segment 24 are tubular, the bottom segment 22 and the top segment 24 act as a crumple-free zone for an occupant 40 in the occupant compartment 14. The airbag 32 is inflatable from the uninflated position to absorb initial impacts to the three-wheeled vehicle 10. Because the airbag 32 is inflated upwardly from the bottom segment 22 toward the top segment 24, and the airbag 32 is elongated along the front 16, the first side 18, and the second side 20, the airbag 32 can absorb initial impacts from several directions, e.g., front 16 impact, oblique impact, side impact, vehicle-roll-over, etc.

As shown in the Figures, the three-wheeled vehicle 10 may be a single-occupant vehicle, as described further below. In other examples, not shown in the Figures, the three-wheeled vehicle 10 may accommodate more than one occupant 40, e.g., two or three occupants 40. The three-wheeled vehicle 10 may be any suitable type of ground vehicle, e.g., a motorized tricycle, auto rickshaw, tuk, etc. The three-wheeled vehicle 10 may be a motorcycle-based vehicle having a single front wheel 26 and two rear wheels 28, 30. As another example, the three-wheeled vehicle 10 may have two front wheels and a single rear wheel. Another example, not shown in the Figures, the vehicle may be the three-wheeled vehicle 10 and include seating for more than one occupant 40 as described below.

The three-wheeled vehicle 10 includes the vehicle frame 12. As shown in the Figures, the vehicle frame 12 may be ovular or egg-shaped. Specifically, the bottom segment 22 and the top segment 24 may be ovular or egg-shaped. In other words, when viewed from a top of the three-wheeled vehicle 10, the vehicle frame 12 is ovular or egg-shaped. Specifically, the front 16 and/or a rear 34 of the vehicle frame 12 has a smaller radius. The vehicle frame 12 may be of any suitable material, e.g., steel, aluminum, or similar material.

The three-wheeled vehicle 10 includes a floor 36. The vehicle frame 12 is supported on the floor 36. Specifically, the bottom segment 22 is supported on the floor 36. The floor 36 may define the lower boundary of the three-wheeled vehicle 10. As shown in the Figures, the floor 36 extends from the front 16 of the vehicle frame 12 to the rear 34 of the vehicle frame 12, and from the first side 18 to the second side 20.

The vehicle frame 12 defines the occupant compartment 14. In the example shown in the Figures, the occupant compartment 14 is a single-occupant compartment 14 designed to house no more than one occupant 40. Specifically, the occupant compartment 14 may be sized and shaped to house one occupant 40 and no more occupants 40 than one. In such an example, the occupant compartment 14 may be sized and shaped to house one seat 38, as described further below, and not more than one seat 38. The size and shape of the occupant compartment 14 as a single-occupant compartment 14 may be defined by the vehicle frame 12, i.e., the vehicle frame 12 encloses and dictates the size of the occupant compartment 14. In other examples not shown in the Figures, the occupant compartment 14 may be a multi-occupant compartment 14. The occupant compartment 14 houses occupant(s) 40, if any, of the vehicle. The occupant compartment 14 may extend across the vehicle, i.e., from the first side 18 to the second side 20. The occupant compartment 14 may extend from the front 16 of the vehicle to the rear 34 of the vehicle. As shown in the Figures, the occupant compartment 14 is the compartment interior to the vehicle frame 12.

The three-wheeled vehicle 10 may include a seat 38 in the occupant compartment 14. The seat 38 may include a seatback 42 and a seat bottom (not shown). The seatback 42 may be supported by the seat bottom and may be stationary or movable relative to the seat bottom. The seatback 42 and the seat bottom may be adjustable in multiple degrees of freedom. The seat 38 may be movable relative to the floor 36 to various positions, e.g., movable fore-and-aft and/or cross-vehicle. The seat 38 may be of any suitable type, e.g., a bucket seat 38 as shown in the Figures.

The seat 38 includes an occupant seating area 44. The occupant seating area 44 is the area occupied by an occupant 40 when properly seated on the seat 38. The occupant seating area 44 is in a seat-forward direction of the seatback 42 and above the seat bottom.

In some examples, the vehicle may include additional seats 38 in the occupant compartment 14, e.g., in examples having the multi-occupant compartment 14. For example, the vehicle may include three seats 38. In such an example, the driver's seat 38 is forward of two passenger seats 38. The two passenger seats 38 are positioned on either side of the driver's seat 38, i.e., one passenger seat 38 is adjacent the first side 18, the other passenger seat 38 is adjacent the second side 20.

The vehicle frame 12 has the midline. The midline extends along the vehicle longitudinal axis, i.e., vehicle fore-and-aft. The vehicle frame 12 is elongated along the midline. Specifically, the vehicle frame 12 is elongated from the front 16 to the rear 34 along the midline.

As shown in the Figures, the vehicle frame 12 includes the front 16, the first side 18, and the second side 20, and the rear 34. The front 16 of the vehicle frame 12 is arcuate from the first side 18 to the second side 20. The front 16 of the vehicle frame 12 is bisected by the midline. The rear 34 of the vehicle frame 12 is arcuate from the first side 18 to the second side 20. The rear 34 of the vehicle frame 12 is bisected by the midline. In the example shown in the Figures, the front 16 of the vehicle frame 12 is narrower than the rear 34 of the vehicle frame 12. In other words, the front 16 of the vehicle frame 12 has a smaller radius than the rear 34 of the vehicle frame 12. The arcuate front 16 and rear 34 of the vehicle frame 12 give the vehicle frame 12 the ovular or egg-shape as described above.

In the example shown in the Figures, the front 16 extends from the midline to the rear 34 of the first wheel 26. Specifically, the front 16 terminates where the front 16 is aligned with the rear 34 of the first wheel 26 along the cross-vehicle axis. The first side 18 of the vehicle frame 12 extends vehicle-rearward from the front 16. The first side 18 of the vehicle frame 12 is elongated from the front 16 to the rear 34 along the vehicle-longitudinal axis. The first side 18 of the vehicle frame 12 is spaced from the midline. Specifically, the first side 18 extends vehicle-rearward from the front 16 on one side of the midline. The second side 20 of the vehicle frame 12 extends vehicle-rearward from the front 16. Specifically, the second side 20 extends vehicle-rearward from the front 16 on the other side of the midline. The first side 18 and the second side 20 are each spaced from the midline on the cross-vehicle axis.

The distance between the first side 18 and the second side 20 of the vehicle frame 12 may change between the front 16 and the rear 34. The first side 18 and the second side 20 of the vehicle frame 12 may be curved, straight, or generally straight to accommodate the contours of the occupant compartment 14. As shown in the Figures, the first side 18 and the second side 20 diverge arcuately, from the midline, as each extends from the front 16 toward the rear 34. In other words, the distance between the first side 18 and the second side 20 of the vehicle frame 12 on the cross-vehicle axis may be smaller at the front 16 and larger at the rear 34. As an example in the Figures, as described above, the vehicle frame 12 is ovular or egg-shaped.

In an example shown in the Figures, the distance between the first side 18 and the midline is smaller at the front 16 and larger at the rear 34. The first side 18 of the vehicle frame 12 extend vehicle-rearward appropriately to accommodate the contours of the occupant compartment 14, e.g., the first may be curved, straight, or generally straight to accommodate the contours of the occupant compartment 14. In the example shown in the Figures, the first side 18 is curved. Specifically, as described above, the first side 18 diverges arcuately from the midline, from the front 16 toward the rear 34.

The second side 20 of the vehicle frame 12 is elongated from the front 16 to the rear 34. The second side 20 of the vehicle frame 12 is spaced from the midline. In the example shown in the Figures, the rear 34 is wider cross-vehicle than the front 16. The distance between the second side 20 and the midline may be smaller at the front 16 and larger at the rear 34, as shown in the Figures. The second side 20 of the vehicle frame 12 may extend vehicle-rearward appropriately to accommodate the contours of the occupant compartment 14, e.g., the second side 20 may be curved, straight, or generally straight to accommodate the contours of the occupant compartment 14. In the example shown in the Figures, the second side 20 is curved.

Figure 4:
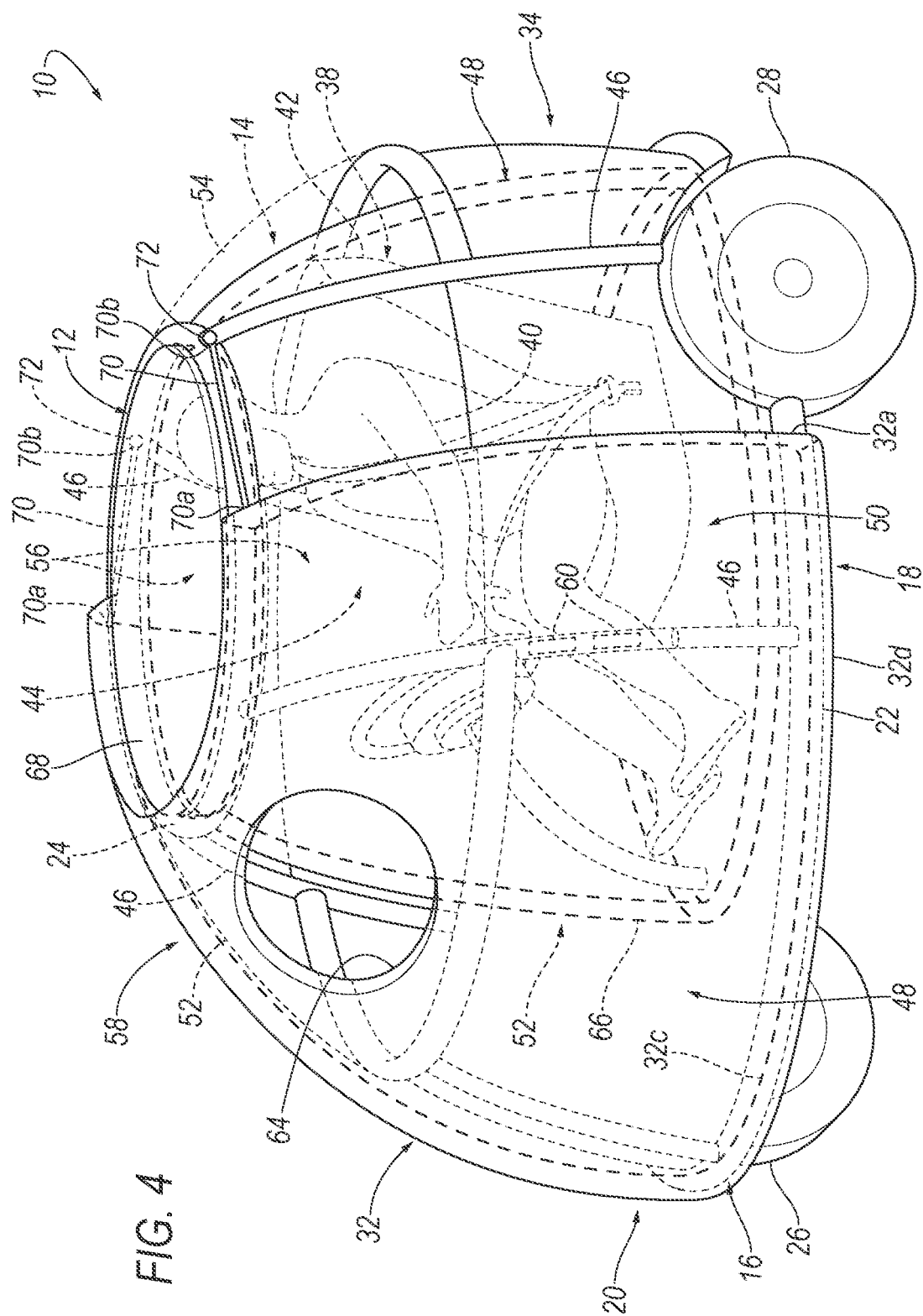
FIG. 4 is a perspective view of the three-wheeled vehicle with the airbag and the second airbag in the inflated position.
Figure 5:
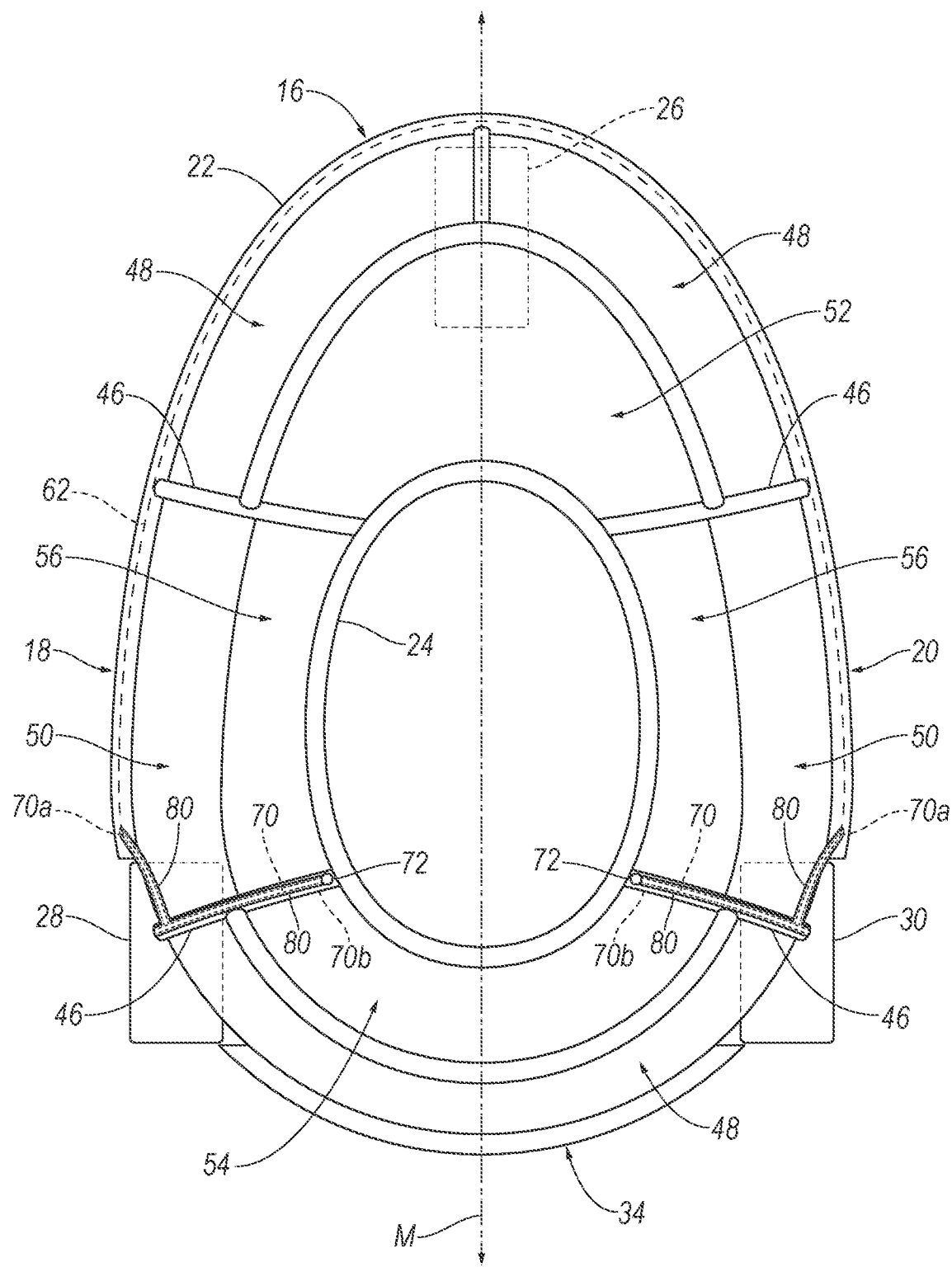
FIG. 5 is a top view of the three wheeled vehicle with the airbag and the second airbag in the uninflated position.
Figure 6:
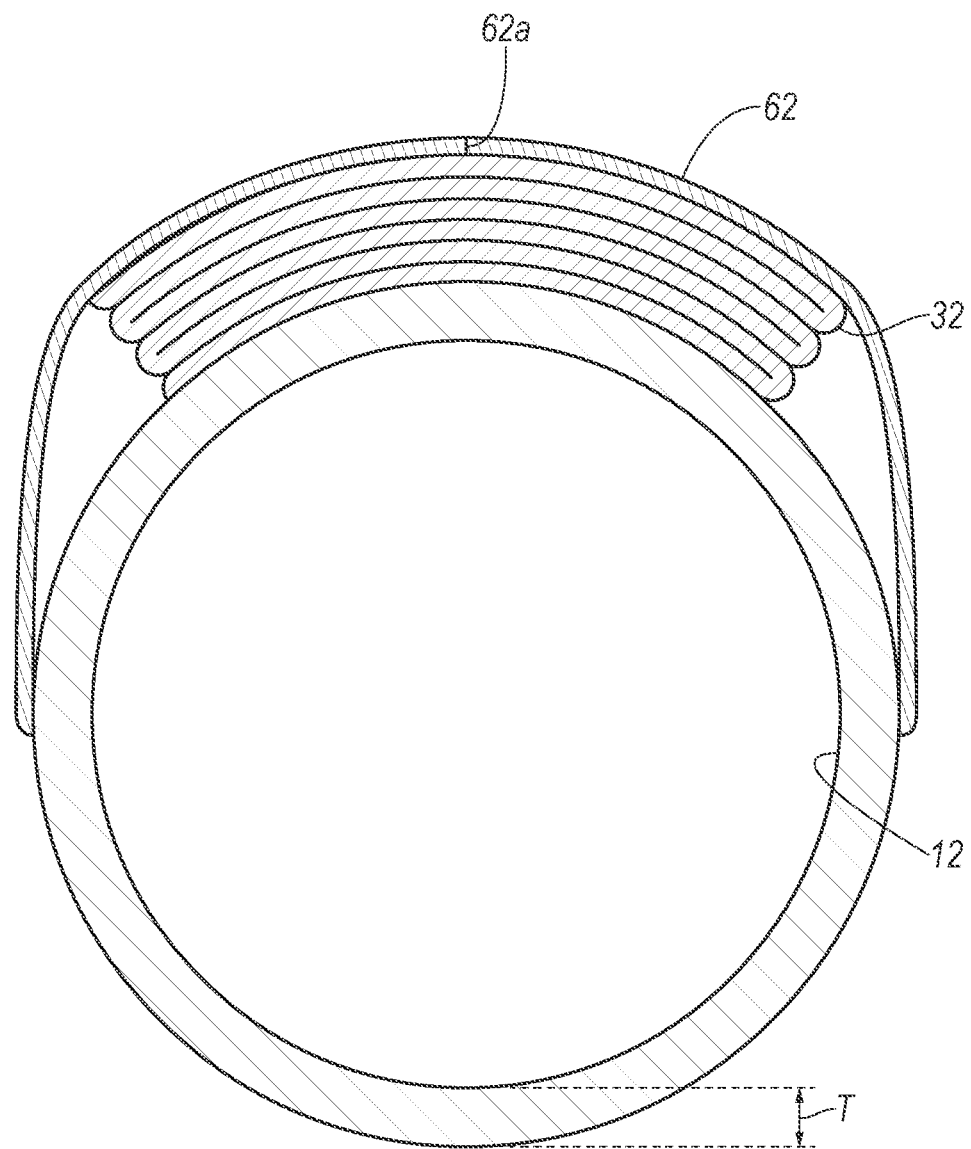
FIG. 6 is a cross-section of a bottom segment including a cover and the airbag.
Figure 7:
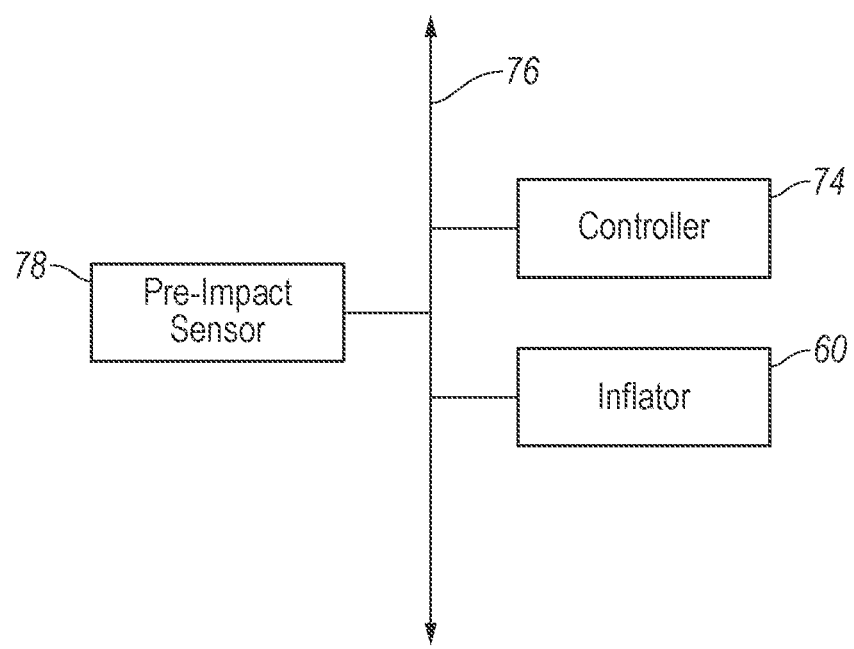
FIG. 7 is a block diagram of a vehicle communications network.

The vehicle frame 12 may be tubular. Specifically, the top segment 24, the bottom segment 22, and the upright segment 46 are tubular as shown in the Figures. The top segment 24, the bottom segment 22, and the upright segment 46 may be round or square with a hollow center. In the example shown in FIG. 4, the bottom segment 22 is round. The vehicle frame 12 may have any suitable wall thickness. The vehicle frame 12 may be roll formed or made from any suitable manufacturing process.

The vehicle frame 12 includes the bottom segment 22 and the top segment 24. The bottom segment 22 extends along the front 16, the first side 18, and the second side 20 of the vehicle frame 12. The bottom segment 22 includes the front 16, the first side 18, and the second side 20. The top segment 24 extends along the front 16, the first side 18, and the second side 20 of the vehicle frame 12. The top segment 24 includes the front 16, the first side 18, and the second side 20. The bottom segment 22 and the top segment 24 are spaced from each other on the vertical axis.

The bottom segment 22 is elongated from the front 16 of the vehicle frame 12 to the second wheel 28. The bottom segment 22 is elongated from the front 16 to the second wheel 28 in the way the first side 18 is elongated from the front 16 to the rear 34 is described above. The bottom segment 22 is elongated from the front 16 of the vehicle frame 12 to the third wheel 30. The bottom segment 22 is elongated from the front 16 to the third wheel 30 in the way the second side 20 is elongated from the front 16 to the rear 34 as described above. The bottom segment 22 is continuous from the second wheel 28 to the third wheel 30, vehicle-forward of the first wheel 26. The bottom segment 22 may be formed from a single piece of tube in any suitable manufacturing process. The bottom segment 22 may be more than one piece of tube, each tube being fastened together in any suitable manufacturing process. The bottom segment 22 may include connections to upright segments 46, as described below.

The top segment 24 is spaced from the bottom segment 22. The top segment 24 includes the front 16, the first side 18, the second side 20, and the rear 34. The top segment 24 extends continuously above the occupant compartment 14. In other words, the top segment 24 is ring-shaped. The top segment 24 may be formed from a single piece of tube and fastened together in any suitable manufacturing process, i.e., a single piece of tube is bent into a ring and fastened together. The top segment 24 may be formed from more than one piece of tube, each tube being fastened together in a ring-shape in any suitable manufacturing process. The top segment 24 has a smaller diameter than the width of the bottom segment 22, i.e., the diameter of the top segment 24 is smaller than the width of the bottom segment 22 from the first side 18 to the second side 20. The top segment 24 may include connections to upright segments 46, as described below.

The vehicle frame 12 may include upright segments 46. As shown in the Figures, the upright segments 46 extend from the bottom segment 22 to the top segment 24. Specifically, the upright segments 46 extend upwardly from the bottom segment 22 to the top segment 24. The upright segments 46 may be contoured to accommodate the contours of the occupant compartment 14. In the example shown in the Figures, the upright segments 46 are curved. The upright segments 46 curve inward from the bottom segment 22 to the top segment 24. Specifically, the upright segments 46 are convex relative to the exterior of the vehicle. In other words, the vehicle is dome-shaped. The upright segments 46 may be connected to the bottom segment 22 and to the top segment 24 in any suitable manner, e.g., welding, fasteners, adhesive, etc. The upright segments 46 may be a single piece of tube and fastened to the bottom segment 22 and the top segment 24 in any suitable manufacturing process. The upright segments 46 may be more than one piece of tube, each tube being fastened together in any suitable manufacturing process.

As described above, the rear 34 of the vehicle frame 12 may be wider than the front 16 of the vehicle frame 12. As shown in the Figures, the rear 34 includes the second wheel 28 and the third wheel 30. The rear 34 of the vehicle frame 12 is curved from the second wheel 28 to the third wheel 30. The rear 34 of the vehicle frame 12, specifically the bottom segment 22, has a larger radius than the front 16 of the vehicle frame 12. The rear 34 of the top segment 24 may have a similar radius relative to the front 16 of the top segment 24.

As shown in the Figures, the three-wheeled vehicle 10 may include body panels 48. The body panels 48 are supported on the vehicle frame 12. Specifically, the body panels 48 are fixed to the vehicle frame 12. As one example, shown in the Figures, one body panel 48 is fixed to the bottom segment 22 and two upright segments 46. The body panels 48 may be made of any suitable material, e.g., aluminum, composite, plastic, etc. The body panels 48 may be fixed to the frame in any suitable manner, e.g., fasteners, welding, etc.

The three-wheeled vehicle 10 may include a vehicle door 50 openable relative to the vehicle frame 12 for the occupant 40 to enter and exit the occupant compartment 14. As shown in the Figures, the vehicle includes the vehicle door 50 on the first side 18 of the vehicle. In such an example, the vehicle door 50 provides access to the seat 38 in the occupant compartment 14. In other examples, not shown in the Figures, the vehicle may include a second vehicle door 50 on the second side 20 of the vehicle.

The vehicle door 50 may be hingedly connected to the vehicle frame 12. The vehicle door 50 may be hingedly connected to one of the upright segments 46 between the bottom segment 22 and the top segment 24. As shown in the Figures, the vehicle door 50 is hingedly connected to the upright segment 46 adjacent the bottom segment 22. The vehicle door 50 is openable from a closed position to an open position about a generally vertical axis. In the open position, the occupant 40 can enter and exit the occupant compartment 14. In the closed position, as shown in the Figures, the vehicle door 50 abuts the bottom segment 22, two of the upright segments 46, and the top segment 24. Specifically, in the closed position, the vehicle door 50 abuts the first side 18 of the bottom segment 22.

The three-wheeled vehicle 10 may include a windshield 52 at the front 16 of the vehicle frame 12. The windshield 52 extends from the first side 18 of the vehicle to the second side 20 of the vehicle. In an example shown in the Figures, the windshield 52 extends from one upright segment 46 to another upright segment 46. The windshield 52 may extend from the top segment 24 toward the bottom segment 22. As described above, the vehicle includes one body panel 48 fixed to the bottom segment 22. As shown in the Figures, the one body panel 48 fixed to the bottom segment 22 extends upwardly from the bottom segment 22 toward the top segment 24 to the windshield 52. The three-wheeled vehicle 10 may include a second windshield 54 at the rear 34 of the vehicle frame 12. As shown in the Figures, the second windshield 54 extends from one upright segment 46 to another upright segment 46 and extends downwardly from the top segment 24 toward the bottom segment 22. The windshield may be glass, plastic, or other suitable material.

The three-wheeled vehicle 10 may include a window 56. The window 56 may be supported on the door. The window 56 may be moveable from a raised position to a lowered position, for example the window 56 may move in the vertical direction. As shown in the Figures, in the raised position, the window 56 is supported on the door and abuts the top segment 24. The window 56 may be glass, plastic, or other suitable material.

As shown in the Figures, the vehicle may include the first wheel 26, the second wheel 28, and the third wheel 30. The first wheel 26 is disposed at the front 16 of the vehicle frame 12. Specifically, the first wheel 26 is disposed at the midline of the front 16. The second wheel 28 is disposed on the first side 18 of the vehicle frame 12. The third wheel 30 is disposed on the second side 20 of the vehicle frame 12.

The first wheel 26, the second wheel 28, and the third wheel 30 may each be connected to the bottom segment 22. As shown in the Figures, and described above, the first wheel 26 is disposed at the front 16 of the vehicle frame 12. The first wheel 26 may be rotatable about a vertical axis relative to the vehicle frame 12. As one example, the first wheel 26 may rotate toward the first side 18 to turn the vehicle in one direction. As another example the first wheel 26 may rotate toward the second side 20 to turn the vehicle in another direction. The first wheel 26 may be connected to the bottom segment 22 in any suitable manner, e.g., on a wheel hub assembly (not shown).

The second wheel 28 and the third wheel 30 are disposed at the sides of the vehicle frame 12. In the example shown in the Figures, the second wheel 28 and the third wheel 30 are disposed vehicle-rearward of the door. Specifically, the second wheel 28 and the third wheel 30 are inline with each other along the cross-vehicle axis. The second wheel 28 and the third wheel 30 may be connected to each other with an axle (not shown). The axle may be any suitable type of axle, e.g., a beam axle. The second wheel 28 and the third wheel 30 may be connected to the bottom segment 22 in any suitable manner, e.g., on a wheel hub assembly (not shown).

The three-wheeled vehicle 10 may include a vehicle powertrain (not shown). The vehicle powertrain may drive the first wheel 26, the second wheel 28, and/or the third wheel 30. As one example, the vehicle powertrain may drive the first wheel 26 only. As another example, the vehicle powertrain may drive the second wheel 28 or the third wheel 30 only. As another example, the vehicle powertrain may drive both the second wheel 28 and the third wheel 30. In the example where the vehicle includes the axle and the powertrain drives the second and/or the third wheel 30, the powertrain may drive the axle, and the axle rotates the second and/or the third wheel 30. The vehicle powertrain may drive any combination of wheels.

The three-wheeled vehicle 10 includes an airbag assembly 58 supported on the vehicle frame 12. The airbag assembly 58 includes the airbag 32, an inflator 60, and a cover 62. vehicle frame 12. Specifically, the airbag 32 is supported by the bottom segment 22. The airbag 32 is inflatable from an uninflated position to an inflated position. As shown in the Figures, the three-wheeled vehicle 10 includes the cover 62 on the airbag 32 when the airbag 32 is in the uninflated position. In the example shown in the Figures, the airbag 32 is fixed to the bottom segment 22 and covered by the cover 62. The cover 62 may include a tear seam 62a. During inflation, the airbag 32 breaks the cover 62, i.e., ruptures the tear seam 62a, to inflate to the inflated position. The airbag 32 may be fixed to the bottom segment 22 in any suitable manner, e.g., adhesives, welding, fasteners, etc.

As shown in the Figures, the airbag 32 has a first rear side 32a and a second rear side 32b. The airbag 32 may have an inner panel 32c and an outer panel 32d. The inner panel 32c and the outer panel 32d span from the first rear side 32a to the second rear side 32b. In the inflated position, the inner panel 32c is spaced from the outer panel 32d. The inner panel 32c and the outer panel 32d define an inflation chamber. The inner panel 32c and the outer panel 32d may be connected in any suitable manner, e.g., ultrasonic welding, stitching, adhesives, etc. Alternatively, the inner panel 32c and the outer panel 32d may be unitary, i.e., a single, uniform piece of material with no seams, joints, fasteners, or adhesives holding them together.

The airbag 32 in the uninflated position is elongated along the front 16, and the first side 18 and the second side 20 of the vehicle frame 12. As shown in the Figures, the airbag 32 in the uninflated position is elongated from the second wheel 28 to the third wheel 30 along the bottom segment 22. In the inflated position, the airbag 32 is elongated from one upright segment 46 on the first side 18 to another upright segment 46 on the second side 20.

The airbag 32 is inflatable upwardly toward the top segment 24 from the uninflated position. As an example, shown in the Figures, the airbag 32 is inflatable upwardly from the bottom segment 22 toward the top segment 24. Specifically, the airbag 32 in the inflated position extends from the bottom segment 22 to the top segment 24.

Figure 2:
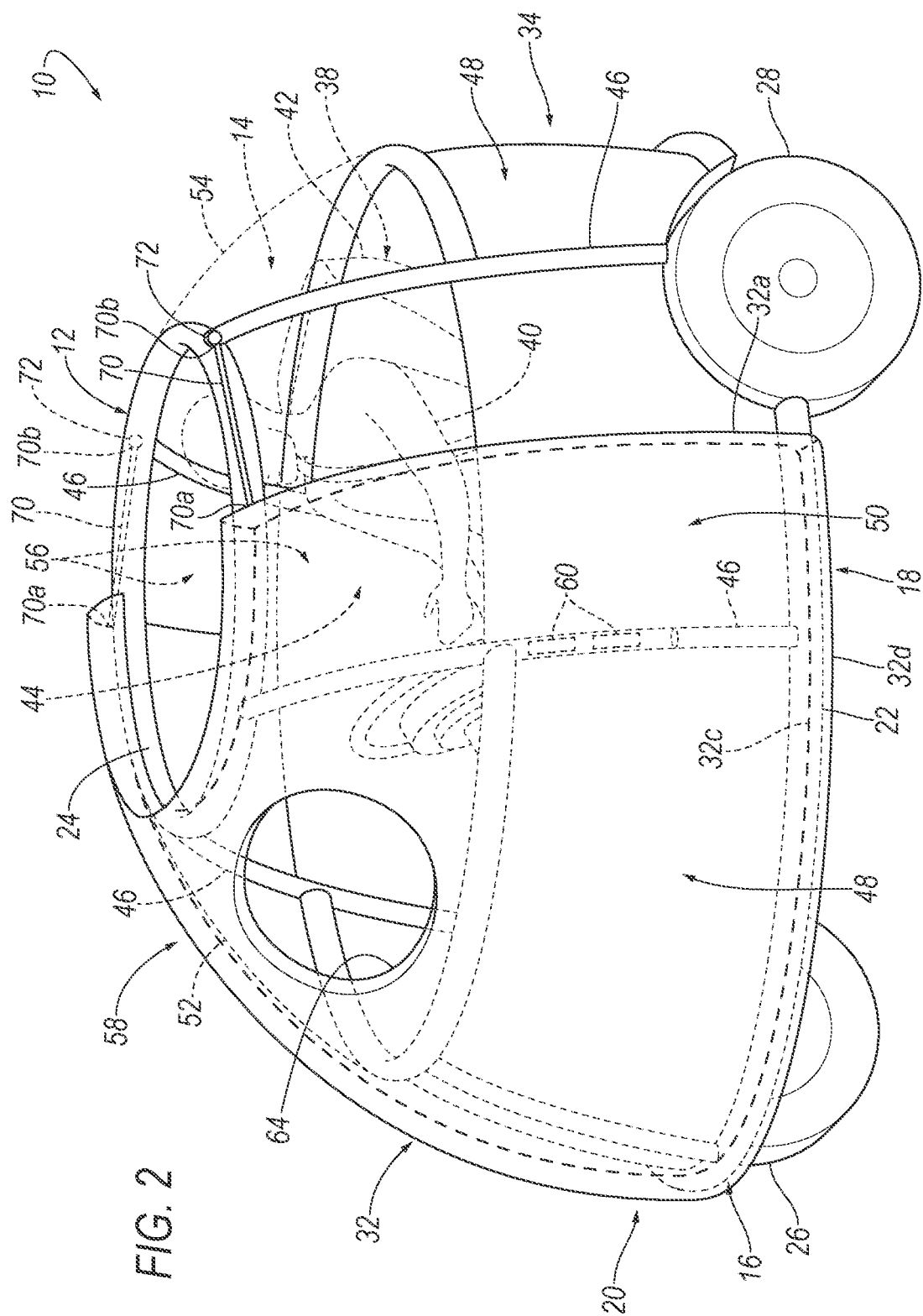
FIG. 2 is a perspective view of the three-wheeled vehicle with the airbag in the inflated position.
Figure 3:
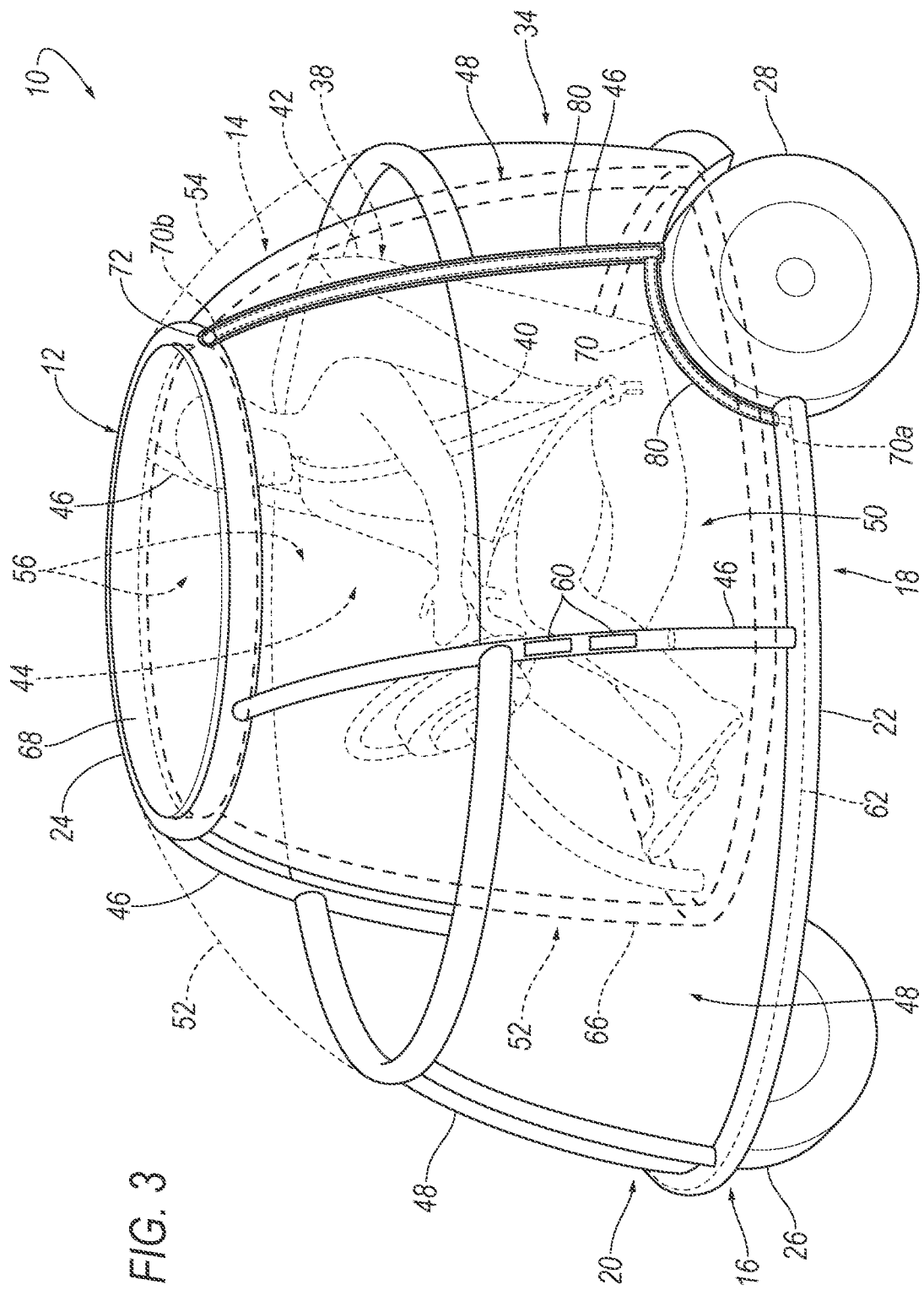
FIG. 3 is a perspective view of the three-wheeled vehicle with the second airbag in the inflated position.

The airbag 32 is inflatable exterior to the vehicle frame 12. As shown in FIG. 2, in the inflated position, the airbag 32 is vehicle-forward of the vehicle frame 12. The inner panel 32c is adjacent the vehicle frame 12 and vehicle-forward of the vehicle frame 12. Specifically, as shown in the Figures, the inner panel 32c abuts the one body panel 48 and the windshield in the inflated position. The windshield is between the occupant compartment 14 and the inner panel 32c when the airbag 32 is in the inflated position. The airbag 32 may include a viewport 64 aligned with the windshield. The viewport 64 allows the driver to see the vehicle-forward surroundings exterior to the airbag 32 from the occupant compartment 14.

As described above, the airbag 32 is supported on the bottom segment 22 from the second wheel 28 to the third wheel 30. The airbag 32 includes the first rear side 32a and the second rear side 32b. The airbag 32 in the inflated position extends from the midline to the second wheel 28. Specifically, the airbag 32 extends from the midline to the second wheel 28 along the first side 18 of the bottom segment 22 to the first rear side 32a. As shown in the Figures, the airbag 32 follows the contour of the first side 18 of the bottom segment 22, i.e., the airbag 32 curves from the midline to the second wheel 28. The first rear side 32a is adjacent the second wheel 28 in the uninflated position. The airbag 32 in the inflated position extends from the midline to the third wheel 30. Specifically, the airbag 32 extends from the midline to the third wheel 30 along the second side 20 of the bottom segment 22 to the second rear side 32b.

As shown in the Figures, the airbag 32 follows the contour of the second side 20 of the bottom segment 22, i.e., the airbag 32 curves from the midline to the second wheel 28. In the inflated position, the airbag 32 extends from the second wheel 28 to the third wheel 30 along the bottom segment 22 around the front 16 of the vehicle frame 12. The second rear side 32b is adjacent the third wheel 30 in the uninflated position.

As shown in the Figures, the airbag 32 extends across the vehicle door 50 in the inflated position. As described above, the vehicle door 50 is positioned between two upright segments 46. In an example shown in the Figures, the airbag 32 extends vehicle rearward from the midline along the first side 18 and the second side 20 beyond one of the upright segments 46. In this example, the airbag 32 extends across the vehicle door 50, i.e., partially across the vehicle door 50. In other examples, the airbag 32 may extend vehicle rearward from the midline to the second upright segment 46, i.e., the rearward upright segment 46. In such examples, the airbag 32 extends across the vehicle door 50 from one upright segment 46 to the other upright segment 46.

The three-wheeled vehicle 10 includes a second airbag 66. The second airbag 66 is inflatable from an uninflated position to an inflated position. In the inflated position, the second airbag 66 surrounds the occupant 40 in the occupant compartment 14. As shown in the Figures, in the inflated position, the second airbag 66 is between the occupant 40 and the vehicle frame 12, i.e., the body panels 48, the windshields, the window 56, etc. The second airbag 66 controls the kinematics of the occupant 40 in the occupant compartment 14, in response to a vehicle impact.

The second airbag 66 is supported by the top segment 24. In the example shown in the Figures, the second airbag 66 is connected to the upper segment, i.e., directly or indirectly connected. The second airbag 66 may be connected to the upper segment in any suitable manner, e.g., fasteners, adhesives, etc.

As shown in the Figures, the second airbag 66 is ring-shaped along the top segment 24. In the example shown in the Figures, the second airbag 66 extends continuously along the top segment 24 in the uninflated position. In another example, the second airbag 66 may have a first end and a second end. In this example, the second airbag 66 may extend from one end to another end along the top segment 24 in a ring, i.e., extends continuously along the top segment 24.

The second airbag 66 is inflatable downwardly toward the bottom segment 22. Specifically, the second airbag 66 is inflatable downwardly into the occupant compartment 14. The second airbag 66 is inflatable downwardly around the seatback 42 and the occupant seating area 44. As shown in the Figures, in the inflated position, the second airbag 66 surrounds the occupant 40. The second airbag 66 extends continuously around the seatback 42 on a generally vertical axis. In the example shown in the Figures, the second airbag 66 extends continuously around the seatback 42, the occupant seating area 44, and the occupant 40 of the vehicle.

The second airbag 66 may include an extension 68. As shown in the Figures, the extension 68 in the uninflated position, is supported on the top segment 24 from the front 16 to the rear 34 on the second side 20. In other words, the extension 68, in the uninflated position, is supported by the top segment 24 on one side of the midline. As shown in the Figures, in the inflated position the extension 68 extends from the second side 20 of the top segment 24 to the first side 18 of the top segment 24. The extension 68 extends above the occupant seating area 44. In the example shown in the Figures, the extension 68 extends across the ring formed by the top segment 24.

The airbag 32 and the second airbag 66 may inflate together, i.e., simultaneously, in response to a pre-impact event, or independently. As an example, in a vehicle rollover event, the airbag 32 and the second airbag 66 may inflate. As another example, in response to a side impact, only the second airbag 66 may inflate, or both airbags 32, 66 may inflate. As a third example, in response to a low speed detected pre-impact event involving a pedestrian, only the airbag 32 may inflate.

The airbag 32 and the second airbag 66 may be fabric, e.g., a woven polymer. As an example, the airbag 32 and the second airbag 66 may be woven nylon yarn, for example, nylon 6.6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The three-wheeled vehicle 10 may include a tether 70 and a retractor 72. As shown in the Figures, the retractor 72 is connected to the top segment 24. Specifically, the retractor 72 is fixed to the top segment 24 adjacent one of the upright segments 46. In the example shown in the Figures, the three-wheeled vehicle 10 includes the tether 70 connected to the airbag 32 and the retractor 72. The tether 70 includes a first end 70a connected to the airbag 32 and a second end 72b 72b connected to the retractor 72. In the uninflated position, the tether 70 may be disposed on the upright segment 46 between the bottom segment 22 and the retractor 72. In the example shown in the Figures, the three-wheeled vehicle 10 includes a cover 80 on the upright segment 46 and the body panel 48. The tether 70 is disposed on the upright segment 46 under the cover 80. The cover 80 may be, as an example shown in the Figures, a removable plastic panel. As shown in the Figures, during inflation of the airbag 32 and retraction of the tether 70, the cover 80 is removed from the upright segment 46 and the body panel 48. In other examples, the cover 80 may be of any suitable material, e.g., fabric.

As shown in the Figures, the three-wheeled vehicle 10 includes the retractor 72 connected to the vehicle frame 12. The retractor 72 is connected to the vehicle frame 12 above the bottom segment 22. Specifically, the retractor 72 is connected to the top segment 24 adjacent one of the upright segments 46. The retractor 72 may be connected to the top segment 24 at any suitable position along the top segment 24. The retractor 72 pulls the airbag 32 toward the top segment 24.

The three-wheeled vehicle 10 includes the tether 70 connected to the airbag 32. In the example shown in the Figures, the tether 70 includes the first end 70a and the second end 72b. The first end 70a of the tether 70 is connected to the airbag 32. The second end 72b of the tether 70 is connected to the retractor 72. The first end 70a of the tether 70 may be connected to the airbag 32 directly, e.g., the first end 70a may be sewn into the airbag 32, or indirectly. The first end 70a of the tether 70 connects to the airbag 32 at the first rear side 32a or the second rear side 32b of the airbag 32.

In the event of a vehicle impact, the retractor 72 pulls the tether 70 upwardly. Specifically, the retractor 72 retracts the second end 72b of the tether 70 pulls the first end 70a of the tether 70 upwardly, and the tether 70 pulls the airbag 32 upwardly toward the top segment 24 during inflation. The retractor 72 and the tether 70 may assist, for example, with positioning the airbag 32 during a vehicle impact. The retractor 72 may be pyrotechnically actuated. The retractor 72 may be any suitable type of retractor 72, for example a rotary actuator. The rotary actuator includes a pyrotechnic charge. The pyrotechnic charge is activated to activate the rotary actuator. In this example, the pyrotechnic charge rotates a shaft connected to the tether 70 such that the tether 70 wraps around the shaft. The pyrotechnic charge is combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The retractor 72 is operatively connected to the tether 70 to pull the tether 70 upwardly. Specifically, in the example where the retractor 72 is the rotary actuator, when the retractor 72 is pyrotechnically actuated, the retractor 72 rotates and retracts the tether 70. For example, as the tether 70 is retracted by the retractor 72, the first end 70a of the tether 70 pulls the airbag 32 upwardly toward the retractor 72 and the top segment 24.

The tether 70 may be of any suitable material, e.g., fabric woven polymer. For example, the fabric may be woven nylon yarn, for example, nylon 6,6. Other examples of woven polymer include polyether ether ketone (PEEK), polyetherketoneketone (PEKK), polyester, etc. The woven polymer may include a coating, such as a silicone, neoprene, urethane, etc. For example, the coating may be polyorgano siloxane. The tether 70 and the airbag 32, and the second airbag 66, may be of the same material.

As described above, the three-wheeled vehicle 10 includes the inflator 60. Specifically, the airbag assembly 58 includes the inflator 60. The inflator 60 is in fluid communication with the airbag 32 and the second airbag 66 to inflate the airbag 32 and the second airbag 66 with an inflation medium such as a gas. The inflator 60 may be, for example, a pyrotechnic inflator 60 that uses a chemical reaction to drive inflation medium to the airbag 32. The inflator 60 may be of any suitable type, for example, a cold-gas inflator 60. The inflator 60 may be supported by the vehicle frame 12. For example, for the airbag 32, the inflator 60 may be fixed to the bottom segment 22 or one of the upright segments 46. In examples having the second airbag 66, the inflator 60, or a second inflator 60, may be fixed to the top segment 24 or one of the upright segments 46. The inflator 60 may be in fluid communication with the airbag 32 and/or the second airbag 66 through one or more fill tubes (not shown).

Figure 8:
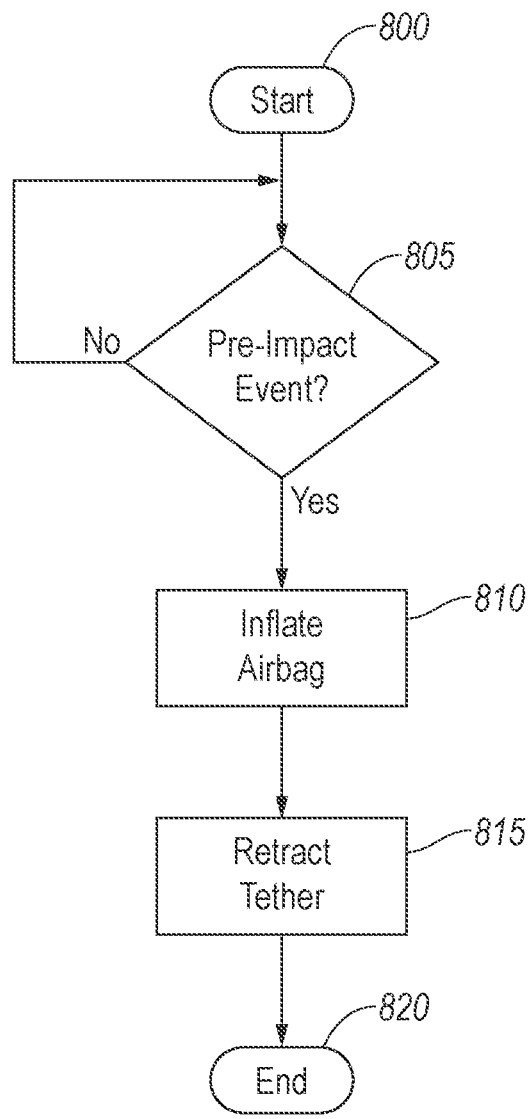
FIG. 8 is a block diagram of a method of inflating the airbag in response to a detected pre-impact event.

The three-wheeled vehicle 10 may include a controller 74 to control components of the three-wheeled vehicle 10 according to the method shown in FIG. 8. Specifically, the controller 74 may be a restraints control module. Use of "based on" and "in response to" herein, including the reference to the instructions stored by the controller 74 and the method, indicates a causal relationship, not merely a temporal relationship.

The controller 74 includes a processor and a memory. The memory includes one or more forms of computer readable media, and stores instructions executable by the controller 74 for performing various operations, including as disclosed herein. As described below, the controller 74 is programmed to perform a specific function or a set of functions. The memory can be of any type, e.g., hard disk drives, solid state drives, servers, or any volatile or non-volatile media. The memory can store the collected data sent from the sensors. The memory can be a separate device from the controller 74, and the controller 74 can retrieve information stored by the memory via a network in the vehicle, e.g., over a CAN bus, a wireless network, etc. Alternatively or additionally, the memory can be part of the controller 74, e.g., as a memory of the controller 74. The controller 74 may include or be communicatively coupled to, e.g., via, a vehicle network such as a communications bus as described further below, more than one processor, for example included in components such as sensors, electronic control units ECU's or the like included in the vehicle for monitoring and or controlling various vehicle components. As shown in the Figure, the controller 74 is generally arranged for communications on a vehicle communication network 76 that can include a bus in the vehicle such as a controller 74 area network can or the like, and or other wired and or wireless mechanisms. Further, as mentioned below, various sensors may provide data to controller 74 via the vehicle communications network 76.

The three-wheeled vehicle 10 may include at least one pre-impact sensor 78 in communication with the inflator 60. The pre-impact sensor 78 is designed to detect a pre-impact event, i.e., impending impact to the vehicle. The inflator 60 may be activated based on pre-impact event. The pre-impact sensor 78 may be of any suitable type, for example, such as radar, LIDAR, and vision-sensing systems. The vision sensing systems may include one or more cameras, CCD image sensors, CMOS image sensors, etc. The pre-impact sensor 78 may be located at numerous points in or on the vehicle. The controller 74 may be in communication with the pre-impact sensor 78 and the inflator 60 via the vehicle communications network 76.

The controller 74 may be programmed to determine a pre-impact event has occurred, e.g., an impending impact to the vehicle, as shown in FIG. 8. For example, shown in block 805, the controller 74 may determine that a vehicle impact is about to occur based on information received from the pre-impact sensor 78 via the vehicle communications network 76.

The controller 74 instructs the inflator 60 to initiate inflation of the airbag 32, as shown in 810, and retract the retractor 72, as shown in 815, after initiation of inflation of the airbag 32. Accordingly, the retraction of the tether 70 pulls the airbag 32 toward the top segment 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A three-wheeled vehicle comprising:
a vehicle frame defining an occupant compartment;
the vehicle frame having a front, a first side extending vehicle-rearward from the front, and a second side extending vehicle-rearward from the front;
the vehicle frame including a bottom segment and a top segment, the bottom segment and the top segment being tubular, the top segment and the bottom segment extending along the front and the first side and the second side of the vehicle frame;
a first wheel at a midline of the front of the vehicle frame, a second wheel on the first side of the vehicle frame, and a third wheel on the second side of the vehicle frame; and
an airbag supported by the bottom segment and being inflatable exterior to the vehicle frame upwardly toward the top segment from an uninflated position to an inflated position, the airbag in the uninflated position being elongated along the front, the first side, and the second side of the vehicle frame.

2. The three-wheeled vehicle as set forth in claim 1, wherein the bottom segment is elongated from the front of the vehicle frame to the second wheel and the third wheel.

3. The three-wheeled vehicle as set forth in claim 1, further comprising a vehicle powertrain that drives the first wheel, second wheel, and/or third wheel.

4. The three-wheeled vehicle as set forth in claim 1, wherein the airbag in the inflated position extends to the second wheel and to the third wheel.

5. The three-wheeled vehicle as set forth in claim 4, wherein the airbag in the inflated position extends from the bottom segment to the top segment.

6. The three-wheeled vehicle as set forth in claim 1, further comprising a tether connected to the airbag and a retractor connected to the vehicle frame above the bottom segment, the retractor operatively connected to the tether to pull the tether upwardly.

7. The three-wheeled vehicle as set forth in claim 6, wherein the retractor is connected to the top segment.

8. The three-wheeled vehicle as set forth in claim 1, wherein the top segment of the vehicle frame is ring-shaped.

9. The three-wheeled vehicle as set forth in claim 8, wherein the vehicle frame includes upright segments extending from the bottom segment to the top segment, the upright segments being tubular.

10. The three-wheeled vehicle as set forth in claim 8, further comprising a second airbag supported by the top segment, the second airbag being ring-shaped along the top segment and being inflatable downwardly into the occupant compartment.

11. The three-wheeled vehicle as set forth in claim 10, wherein the occupant compartment is a single-occupant compartment designed to house no more than one occupant.

12. The three-wheeled vehicle as set forth in claim 1, further comprising a vehicle door hingedly connected to the vehicle frame on one of the sides of the frame and between the bottom segment and the top segment.

13. The three-wheeled vehicle as set forth in claim 12, wherein the airbag extends across the door in the inflated position.

14. The three-wheeled vehicle as set forth in claim 13, wherein the airbag extends from the bottom segment to the top segment in the inflated position.

15. The three-wheeled vehicle as set forth in claim 1, further comprising a windshield at the front of the vehicle frame.

16. The three-wheeled vehicle as set forth in claim 1, wherein the airbag extends from the bottom segment to the top segment in the inflated position.

17. The three-wheeled vehicle as set forth in claim 1, further comprising a controller and a pre-impact sensor, the controller being programmed to inflate the airbag in response to a detected pre-impact event by the pre-impact sensor.

18. The three-wheeled vehicle as set forth in claim 1, wherein the occupant compartment is a single-occupant compartment designed to house no more than one occupant.

\* \* \* \* \*